Patented Aug. 28, 1945

2,383,581

UNITED STATES PATENT OFFICE 2,383,581

PROCESS FOR PREPARING FATTY MATERIALS

Clarence Joseph Arrowsmith, New York, N. Y., and John Ross, Ramsey, N. J., assignors to Colgate-Palmolive-Peet Company, Jersey City, N. J., a corporation of Delaware No Drawing. Application May 6, 1943, Serial No. 485,890

19 Claims. (Cl. 260—410.7)

The present invention relates to a process for preparing fatty acid partial esters, especially monoesters, of polyhydric alcohols and, more particularly, to an improved process for preparing fatty acid monoglycerides from fats and fatty oils.

It has long been known that monoglycerides of fatty acids can be prepared by reacting a triglyceride of a fatty acid with glycerine in the presence of a catalyst, and other fatty acid monoesters of polyhydric alcohols are similarly prepared. However, according to the art, a reaction mixture containing mono- and di-glycerides was believed not to be distillable without undergoing a reversion to glycerine and triglycerides, thereby causing continuous removal of the glycerine by volatilization, and the prior art processes employed for recovery of the monoesters are indirect and extremely difficult, time-consuming and expensive. In one of these procedures, the reaction mixture was extracted with ether, excess glycerine was withdrawn, and the ether extract was cooled to crystallize out monoglycerides and diglycerides. This crystallization was repeated as many times as required to achieve the degree of purity desired.

It is an object of the present invention to provide an improved process for rapidly recovering fatty acid partial esters of polyhydric alcohols in high yield from mixtures containing them.

It is another object of the invention to provide a new method for treating alcoholysis reaction mixtures, whereby fatty acid monoesters of polyhydric alcohols can be easily and inexpensively obtained.

It is also an object of this invention to provide a novel and direct process for removing fatty acid monoglycerides in a relatively high state of purity from alcoholysis reaction mixtures in a single distillation.

Other objects and advantages of the invention will be apparent from the following description.

According to the present invention, a mixture resulting from the reaction in the presence of a catalyst of a fatty material with an alcohol, at least one of which reactants is polyacidic (i. e., contains two or more hydroxyl groups or is a derivative of a compound having at least two hydroxyl groups), and containing fatty acid partial esters of a polyhydric alcohol is treated to remove the influence of the catalyst, preferably by neutralization or partial neutralization of the mixture. The fatty acid partial esters of the polyhydric alcohol are separated from other ingredients of the mixture by distillation without substantial reversion.

In preparing fatty acid monoglycerides, for example, a reaction between a triglyceride and glycerine may be carried out in the presence of either an alkaline or an acid alcoholysis catalyst. It has now been found that, if no trace of the alcoholysis catalyst remains after the reaction or if any catalyst present after the reaction is inhibited, the reaction mixture may be heated to volatilize excess glycerine, and the monoglycerides may be distilled, without substantial chemical degradation or reversion. Monoglycerides may be recovered in like manner from mixtures resulting from the alcoholysis, in the presence of a catalyst, of a triglyceride (and/or a diglyceride) with a lower alkyl alcohol. Similarly, monoglycerides may also be recovered from reaction mixtures resulting from treating a lower alkyl fatty acid ester (e. g., the ethyl ester of a fatty acid) with glycerine in the presence of a catalyst or from mixtures resulting from the esterification of a fatty acid with excess glycerine in the presence of a catalyst.

In a preferred procedure for forming the reaction mixture, a fatty acid ester (whether naturally-occurring or synthetically produced) is contacted with a polyhydric alcohol, preferably in large excess, in the presence of a small amount of an alcoholysis catalyst. The mixture may be kept at ambient temperatures or may be heated during a period of a few minutes to obtain rapid alcoholysis. When the reaction has reached the desired point, whether in a single contacting or in a series of steps, the catalyst is destroyed or otherwise inhibited, preferably by neutralizing the mixture. The entire reaction mixture is then directly distilled first to remove excess polyhydric alcohol, with or without another alcohol liberated from the esters, and then to obtain a distillate comprising polyhydric alcohol partial esters. If desired, only the excess polyhydric alcohol is removed by distillation, and the remainder of the mixture comprising polyhydric alcohol partial esters may be recovered for use without further purification. In certain cases, the partial esters produced may have lower boiling points than alcohols involved, so that the esters are distilled off and said alcohols can be left in the distillation residues.

According to an alternative procedure, the catalyst may be destroyed or otherwise inhibited, preferably by neutralization or partial neutralization, after removal of the excess alcohol. In this modification, a proportion of the product may revert at the volatilization temperature of the alcohol, but this proportion may be relatively small, depending upon the boiling-point under the operating conditions of the polyhydric alcohol employed.

The fatty material treated by the process may be any of the natural fatty acid esters, such as fats or fatty oils suitable for employment by the soap-making art, or any other fatty acid esters, whether of a polyhydric alcohol, such as glycerol or the glycols, or of a monohydric alcohol, or mixtures of these esters; free fatty acids corresponding to the esters may also be used. It is preferred to employ esters of fatty acids having about eight to about twenty-six, and preferably about twelve to about twenty, carbon atoms per molecule of fatty acid. Such fatty material includes coconut oil, palm oil, olive oil, cottonseed oil, corn oil, soya bean oil, tung oil, wool fat, tallow, whale and fish oils, etc., as well as the alkyl esters of the fatty acids corresponding to these oils, especially the methyl and ethyl esters. It is preferred to employ a refined oil containing substantially no moisture.

In carrying out the alcoholysis or esterification according to this invention, aliphatic alcohols, including aryl-substituted aliphatic alcohols, may be employed for the reaction. Either a monohydric or a polyhydric alcohol may be used, provided that, if a monohydric alcohol be employed, the fatty material used is an ester of an alcohol having at least two hydroxyl groups. Short-chain aliphatic polyhydric alcohols are preferably employed, particularly the saturated alcohols and especially the lower polyhydric alcohols having two to about six carbon atoms per molecule. Thus, alcohols satisfactory for use in forming esters with the fatty acids or fatty acid components of the esters treated include glycerol and other trihydroxy alkanes, ethylene glycol, propylene glycol, trimethylene glycol, the amylene glycols, mannitol, sorbitol, erythritol, etc.

While any proportion of fatty material and alcohol may be used, depending upon the degree of radical interchange desired, it is preferred, when preparing monoesters, to employ an amount of polyhydric alcohol at least about 50% in excess of the calculated theoretical amount necessary for reaction with the particular esters treated, and particularly satisfactory results have been obtained when using an excess of at least three to ten times the stoichiometric amount required. On the other hand, when preparing di- or triesters, it is usually preferable to use no more than the stoichiometric amount. Thus, while two mols of glycerine are theoretically sufficient to convert all of one mol of a triglyceride to the monoglyceride, it has been found that, under these conditions, a large proportion of the resulting product is in the form of diglycerides. However, a proportion of about ten mols of glycerine to one of triglyceride gives a high yield of monoglycerides.

In selecting an alcoholysis catalyst, an alkaline or an acidic catalyst may be employed. Among those which have been found suitable for use in the present process are sodium hydroxide, sodium methylate, sodium carbonate and other alkaline alkali metal salts, barium oxide, lime, tetramethyl ammonium hydroxide, hydrochloric acid, trichloracetic acid, phosphoric acid, sulphuric acid, aluminum chloride, boron fluoride, glycerine monoacid sulphate, alkyl sulphuric acids, organic sulphonic acids, etc. While it is possible to obtain good yields of monoesters with proportions of alkaline catalyst up to about 0.30 mol per equivalent of fatty material and higher, it is preferred to use large excesses of polyhydric alcohol and to introduce relatively small amounts of catalyst, say of the order of about 0.03 mol to about 0.10 mol per equivalent of esters in order to reduce the amount of soap formed. With acidic catalysts, similar proportions are generally employed. A convenient way of introducing the catalyst into the reaction mixture is in admixture with and, where practical, advantageously in solution in the alcohol employed. Such catalysts, in similar amounts, may be used in carrying out the esterification of fatty acids. Acid catalysts are particularly appropriate for use with oils containing a large proportion of free fatty acids, as the acids are esterified during the process.

With either acid or alkaline catalyst, the reaction temperature may vary from about 20° C. to about 250° C. or higher, but below the temperature of substantial degradation of the reactants or products formed. In alcoholysis with glycerine, it is preferred to maintain temperatures of about 150° C. to about 250° C., and temperatures of about 180° C. to about 200° C. have been found to give particularly satisfactory results. Similarly, when carrying out the alcoholysis with propylene glycol, temperatures of about 140° C. to about 220° C., and preferably about 160° C. to about 195° C., are advantageously maintained. In general, the operation may be carried out as a batch, intermittent or continuous process, and at reduced pressures, at atmospheric pressure or at superatmospheric pressures, but is is preferred to provide a pressure in the reaction vessel or coil sufficient to maintain the polyhydric alcohol in the liquid phase.

The catalyst is destroyed or otherwise inhibited when the reaction has gone to the degree of completion desired. A method for inhibiting the catalyst, whether alkaline or acid, is to neutralize the reaction mixture or to bring it to a pH of about 5 to about 8, and preferably to a pH of about 6 to about 7, as indicated by the reading on the dial of a standard electronic pH meter using glass electrodes. The apparent pH of the mixture may be determined by indicators, a glass electrode or other suitable means.

In neutralizing a reaction mixture resulting from the alkaline alcoholysis of fatty esters, the neutralization or change in pH is preferably carried out by the addition of an acid stronger than the fatty acids of the esters. In general, it is preferred to employ a strong mineral acid for this purpose. Strong organic acids may also be used, and these may be employed with subsequent washing to remove the salts formed.

Among the acids which have proved satisfactory for use as inhibitors in the present process are glacial acetic acid, hydrochloric acid, sulphuric acid, phosphoric acid, sulphur dioxide, benzene sulphonic acid, etc. It is preferred to employ a substantially anhydrous mineral acid to give an alcohol suitable for reuse in the process without dehydration, as otherwise the excess alcohol recovered from the subsequent distillation step may contain a proportion of water. Where an aqueous acid is used, the amount of water introduced with the acid during acidification (that is, the concentration of the acid) is controlled so that the proportion of water in the recovered alcohol is relatively small.

When the reaction is carried out in the presence of an acid alcoholysis catalyst, the catalyst is inhibited when the reaction has reached the degree of completion desired by introducing a material of an alkaline nature in strength and amount sufficient to bring the mixture to the desired pH. Among the alkaline materials satisfactory for use as inhibitors of acidic catalysts are caustic soda, soda ash, soap, sodium tetraborate, sodium acetate and the like, and said materials are preferably added in substantially anhydrous condition. An amount no more than sufficient to neutralize all of the acid catalyst is added.

In this manner, whether the reaction is catalyzed by an acid or an alkaline catalyst, the reaction mixture is of substantially the same composition after inhibition of the catalyst.

When the influence of the catalyst has been eliminated, the excess unreacted alcohol, as well as any alcohol freed from the esters treated, is preferably removed by distillation, heating the reaction mixture to a temperature sufficient to volatilize the alcohols but below the temperature of substantial decomposition or degradation of the products. Although, in certain cases, atmospheric pressure or superatmospheric pressures may be employed during this distillation, it is preferred to distill the mixture under reduced pressures. In general, when forming monoglycerides or glycolmonoesters from coconut oil or tallow or oils having a mixture of glycerides of like molecular weight, temperatures below about 150° C. at absolute pressures of about 3 to 4 mm. of mercury give satisfactory results.

After removal of the alcohols, the remainder of the mixture comprising the partial esters may be recovered without further processing or the product may be subjected to further reduced pressures, say of the order of about 1 to about 10 mm. of mercury absolute, and then rapidly or flash distilled. With coconut oil as a starting material, monoesters of propylene glycol can be distilled at about 2 to 3 mm. of mercury at about 150° C. to about 160° C.; monoglycerides of coconut oil distill at about 185° C. to about 190° C. under an absolute pressure of about 1 mm. of mercury. With certain of the products contemplated, especially polyesters, it may be necessary or desirable to employ molecular distillation.

The following examples illustrate this invention, but the invention is not limited thereby.

*Example I*

About 428 parts by weight of methyl laurate are mixed with 304 parts of propylene glycol, and the mixture is heated to a temperature of 150° C. for two hours, being stirred continuously during this reaction time. About 6 parts of sodium hydroxide are added intermittently during the heating. Methyl alcohol distills off during the reaction, and at the end of the reaction period 7 parts of concentrated sulphuric acid are added in order approximately to neutralize the mixture. The reaction product is then vacuum-distilled under an absolute pressure of 2 to 3 mm. Between 150° C. and 160° C., 296 parts of a product which is identified as the lauric acid monoester of propylene glycol are recovered. Continuing the heating of the remainder of the reaction mixture to a somewhat higher temperature at the same pressure, 73 parts of a further product, identified as the lauric acid diester of propylene glycol, are recovered.

*Example II*

About 285 parts by weight per minute of tallow are preheated to 130° C. and passed through a homogenizer together with 300 parts of glycerine at about the same temperature. Concentrated sulphuric acid is introduced into the homogenizer at a rate of 1 part per minute. The effluent from the homogenizer is run into a reaction coil having a holding time of about thirty minutes, a temperature of 130° C. being maintained, and the reaction mixture therefrom passes into a mixing coil. Sodium hydroxide dissolved in glycerine is there added to the mixture at a rate just insufficient to neutralize the reaction mixture, and the mixture flows into a continuous vacuum still maintained at a pressure of about 4 mm. of mercury absolute. Glycerine is distilled off at about 150° C., and the remainder of the mixture comprising tallow fatty acid monoglycerides is continuously removed and collected.

*Example III*

An amount of cottonseed oil is mixed with about twice its weight of propylene glycol and about 0.4% of its weight of concentrated sulphuric acid. The mixture is heated to 140° C. and is kept at this temperature for about three hours. Sodium hydroxide is then added in amount just insufficient to neutralize the mixture. The mixture is thereafter distilled at an absolute pressure of 3 to 4 mm. of mercury. Cottonseed fatty acid monoesters of propylene glycol are distilled off between 170° C. and 180° C., and a yield of monoesters equivalent to approximately 90% of the calculated theoretical yield is obtained.

*Example IV*

Equal weights of tallow and glycerine are mixed together and heated to about 180° C. Sodium hydroxide is then added intermittently to the total amount of about 0.5% of the weight of the tallow over a period of some three hours. During this time the temperature is maintained between 210° C. and 220° C. at atmospheric pressure, and an atmosphere of carbon dioxide is provided. The mixture is cooled and transferred to a separatory vessel, and glycerine settles out and is withdrawn. An amount of glacial acetic acid about three times the weight of sodium hydroxide employed is added to the upper layer, and it is taken up with some 3 to 4 volumes of ether, is repeatedly washed with water, is dried and is blown to remove ether. The material is put in a distillation vessel and boils at about 230° C. to about 240° C. under an absolute pressure of 1 to 2 mm. of mercury. A distillate comprising tallow fatty acid monoglycerides is collected, and a yield of distillate approximating 87% of the calculated theoretical yield is obtained.

Although the present invention has been described with reference to particular embodiments and examples, it will be apparent to those skilled in the art that variations and modifications of this invention can be made and that equivalents can be substituted therefor without departing from the principles and true spirit of the invention.

The present application is a continuation-in-part of application Serial No. 479,882, filed March 20, 1943.

We claim:

1. The process which comprises reacting a polyhydric alcohol with a fatty material of the group consisting of fatty acids having about twelve to about twenty carbon atoms per molecule and esters thereof in the presence of an alcoholysis catalyst and in the absence of extraneous solvent to provide a liquid body containing a fatty acid partial ester of a polyhydric alcohol; removing the influence of the catalyst; and recovering said fatty acid partial ester as a distillate.

2. The process which comprises reacting an ester of a fatty acid having about twelve to about twenty carbon atoms per molecule of fatty acid with an aliphatic polyhydric alcohol in the presence of an alcoholysis catalyst and in the absence of extraneous solvent to provide a liquid body containing a fatty acid partial ester of a polyhydric alcohol and unreacted polyhydric alcohol, removing the influence of the catalyst, and distilling the liquid body to effect a substantial separation of said unreacted polyhydric alcohol and said fatty acid partial ester.

3. A process for preparing fatty acid monoesters of polyhydric alcohols which comprises reacting an ester of a fatty acid having about twelve to about twenty carbon atoms per molecule of fatty acid with an excess of an aliphatic polyhydric alcohol in the presence of an alcoholysis catalyst and in the absence of extraneous solvent to provide a liquid body containing a fatty acid monoester of a polyhydric alcohol and unreacted polyhydric alcohol, bringing the liquid body to a pH of about 5 to about 8, and substantially separately recovering said unreacted polyhydric alcohol and said fatty acid monoester.

4. A process for preparing fatty acid monoglycerides which comprises reacting an ester of a fatty acid having about twelve to about twenty carbon atoms per molecule of fatty acid with an excess of glycerine in the presence of an alcoholysis catalyst and in the absence of extraneous solvent to provide a liquid body containing a fatty acid monoglyceride and unreacted glycerine, bringing the liquid body to a pH of about 6 to about 7, and distilling unreacted glycerine from said liquid body whereby fatty acid monoglyceride is substantially separated therefrom.

5. A process for preparing fatty acid monoesters of glycols which comprises reacting an ester of a fatty acid having about twelve to about twenty carbon atoms per molecule of fatty acid with an excess of a glycol in the presence of an alcoholysis catalyst and in the absence of extraneous solvent to provide a liquid body containing a fatty acid monoester of the glycol and unreacted glycol, bringing the liquid body to a pH of about 6 to about 7, and distilling unreacted glycol from said liquid body whereby fatty acid glycol monoester is substantially separated therefrom.

6. A process for preparing fatty acid monoesters of propylene glycol which comprises reacting a short chain monohydric alcohol ester of a fatty acid having about twelve to about twenty carbon atoms per molecule of fatty acid with an excess of propylene glycol in the presence of an alcoholysis catalyst and in the absence of extraneous solvent to provide a liquid body containing a fatty acid monoester of propylene glycol and unreacted propylene glycol, bringing the liquid body to a pH of about 6 to about 7, distilling unreacted propylene glycol from said liquid body, and thereafter distilling fatty acid monoester of propylene glycol from said liquid body.

7. A process for preparing fatty acid monoglycerides which comprises reacting an ester of a fatty acid having about twelve to about twenty carbon atoms per molecule of fatty acid with an excess of glycerine in the presence of an alcoholysis catalyst to provide a liquid body containing a fatty acid monoglyceride and unreacted glycerine, approximately neutralizing the liquid body, removing unreacted glycerine therefrom, and distilling the remainder of said liquid body under reduced pressure to obtain a distillate comprising fatty acid monoglyceride.

8. A process for preparing fatty acid monoesters of propylene glycol which comprises reacting an ester of a fatty acid having about twelve to about twenty carbon atoms per molecule of fatty acid with an excess of propylene glycol in the presence of an alcoholysis catalyst to provide a liquid body containing a fatty acid monoester of propylene glycol and unreacted propylene glycol, approximately neutralizing the liquid body, removing unreacted propylene glycol therefrom, and distilling the remainder of said liquid body under reduced pressure to obtain a distillate comprising fatty acid monoester of propylene glycol.

9. A process for preparing fatty acid monoglycerides which comprises reacting a fatty triglyceride with an excess of glycerine in the presence of an alcoholysis catalyst to provide a liquid body containing a fatty acid monoglyceride and unreacted glycerine, bringing the liquid body to a pH of about 6 to about 7, and distilling said liquid body under reduced pressure to obtain a distillate comprising the fatty acid monoglyceride.

10. A process for preparing fatty acid monoglycerides which comprises reacting a fatty triglyceride with an excess of glycerine in the presence of an alkaline alcoholysis catalyst to provide a liquid body containing a fatty acid monoglyceride and unreacted glycerine, introducing an amount of an acid stronger than the fatty acid of the triglyceride sufficient for substantially neutralizing said liquid body, washing said liquid body substantially free of salts formed during the neutralization, and distilling said liquid body under reduced pressure to obtain a distillate comprising fatty acid monoglyceride.

11. A process for preparing fatty acid monoglycerides which comprises reacting a fatty triglyceride with an excess of glycerine in the presence of an acidic alcoholysis catalyst to provide a liquid body containing a fatty acid monoglyceride and unreacted glycerine, introducing an amount of alkaline material just insufficient for substantially neutralizing said liquid body, washing said liquid body substantially free of salts formed during the partial neutralization, and distilling said liquid body under reduced pressure to obtain a distillate comprising fatty acid monoglyceride.

12. In the process for preparing fatty acid partial esters of polyhydric alcohols comprising reacting a fatty material with a polyhydric alcohol in the presence of an alcoholysis catalyst to provide a liquid body containing a fatty acid partial ester of a polyhydric alcohol, the improvement which comprises bringing the liquid body to a pH of about 6 to about 7, and thereafter distilling said liquid body under reduced pressure whereby a distillate comprising fatty acid partial ester is obtained.

13. In the process for preparing fatty acid monoglycerides comprising reacting an ester of a fatty acid having about twelve to about twenty carbon atoms per molecule of fatty acid with an excess of glycerine in the presence of an alcoholysis catalyst to provide a liquid body containing a fatty acid monoglyceride and unreacted glycerine, the improvement which comprises removing the influence of the catalyst from the liquid body, and distilling said liquid body under reduced pressure to obtain a distillate comprising unreacted glycerine and fatty acid monoglyceride.

14. In the process for preparing fatty acid monoesters of propylene glycol comprising reacting an ester of a fatty acid having about twelve to about twenty carbon atoms per molecule of fatty acid with an excess of propylene glycol in the presence of an alcoholysis catalyst to provide a liquid body containing a fatty acid monoester of propylene glycol and unreacted propylene glycol, the improvement which comprises removing the influence of the catalyst from the liquid body, and distilling said liquid body under reduced pressure to obtain a distillate comprising unreacted propylene glycol.

15. The process which comprises heating a mixture consisting of an alcoholysis catalyst, lower monohydric alcohol esters of fatty acids and polyhydric alcohol in the ratio of about 3 to 10 mols of polyhydric alcohol per mol of ester until the reaction is substantially complete, inhibiting the catalyst, distilling off excess polyhydric alcohol, and distilling off the fatty acid monoesters of the polyhydric alcohol under reduced pressure.

16. The process which comprises heating a mixture consisting of an alcoholysis catalyst, lower monohydric alcohol esters of fatty acids and polyhydric alcohol in the ratio of about 3 to 10 mols of polyhydric alcohol per mol of ester until the reaction is substantially complete, distilling off the liberated monohydric alcohol during the reaction, inhibiting the catalyst, distilling off excess polyhydric alcohol, and distilling off the fatty acid monoesters of the polyhydric alcohol under reduced pressure.

17. The process of distilling monoesters of fatty acids with polyhydric alcohols from a reaction mixture containing an alcoholysis catalyst which comprises inhibiting the catalyst and thereafter distilling monoesters from the reaction mixture under reduced pressure not substantially higher than about 10 mm. of mercury absolute.

18. The process of distilling monoesters of fatty acids with polyhydric alcohols from a reaction mixture containing an alcoholysis catalyst of the class consisting of acid and alkali catalysts which comprises neutralizing the catalyst and thereafter distilling monoesters from the reaction mixture under reduced pressure not substantially higher than about 10 mm. of mercury absolute.

19. The process of distilling monoesters of fatty acids with polyhydric alcohols from a reaction mixture containing an alcoholysis catalyst which comprises removing the catalyst and thereafter distilling monoesters from the reaction mixture under reduced pressure not substantially higher than about 10 mm. of mercury absolute.

CLARENCE JOSEPH ARROWSMITH.
JOHN ROSS.